United States Patent

[11] 3,625,958

[72] Inventors Giuseppe Cantatore;
Alberto Bonvicini, both of Terni, Italy
[21] Appl. No. 674,115
[22] Filed Oct. 10, 1967
[45] Patented Dec. 7, 1971
[73] Assignee Montecatini Edison S.p.A.
[32] Priority Oct. 14, 1966
[33] Italy
[31] 28857 A/66

[54] PROCESS FOR THE SYNTHESIS OF SUBSTITUTED 1,4-DIAZA-CYCLOHEPTENES
6 Claims, No Drawings
[52] U.S. Cl. .................................................. 260/239 BC
[51] Int. Cl. ................................................... C07d 53/02
[50] Field of Search ........................................ 260/239 B

[56] References Cited
OTHER REFERENCES

Hickenbottom, Reactions of Organic Compounds, (London, 1948), page 168
Sprague, Chemical Abstracts, Volume 54, cols. 12155-6 (1960)

Primary Examiner—Alton D. Rollins
Attorney—Hubbell, Cohen and Stiefel

CLAIM: Process for the preparation of a substituted 1,4-diaza-cycloheptene of the general formula:

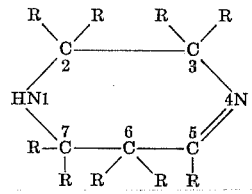

wherein R may be the same or different and is a hydrogen atom or an alkyl group having from about one to 12 carbon atoms. Involves reacting in the presence of an acid catalyst such as hydrochloric acid, nitric acid, acetic acid, formic acid, ammonium nitrate, p-toluene-sulphonic acid, aluminum chloride, ferric nitrate, or ethylenediamine dichlorohydrate, an ethylenediamine of the general formula:

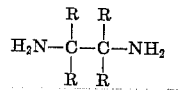

wherein R is as defined above, with a saturated aliphatic ketone of the general formula:

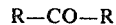

wherein R may be the same or different and is an alkyl group having one to 12 carbon atoms.

PROCESS FOR THE SYNTHESIS OF SUBSTITUTED 1,4-DIAZA-CYCLOHEPTENES

BACKGROUND OF THE INVENTION

1. Field of the Invention

The present invention refers to an improved process for the preparation of substituted 1,4-diaza-cycloheptenes of the general formula (1):

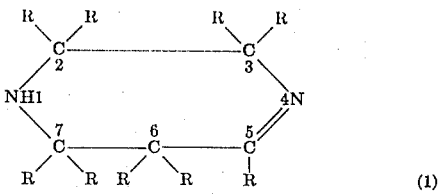

wherein R may be the same or different and is a hydrogen atom or an alkyl group having from about one to 12 carbon atoms. Such products are obtained by the reaction of an ethylenediamine of the general formula:

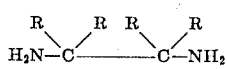

wherein R is as defined above with a saturated aliphatic ketone of the general formula R—CO—R, wherein R may be the same or different and is an alkyl group having from about one to 12 carbon atoms.

2. Description of the Prior Art

Alkylderivatives of 1,4-diaza-4-cycloheptene obtained by reaction of ethylenediamine with saturated aliphatic ketones are known in the literature. Specifically, 5,7,7,trimethyl-1,4-diaza-4-cycloheptene has been prepared starting from ethylenediamine and diacetone alcohol (yield 48 percent) and from ethylenediamine and acetone (yield and about 40 see Chafetz (PB report 133175) and Sprague (PB report 135342; C.A. 54, 12155i). According to the known processes, a saturated aliphatic ketone and ethylenediamine are reacted for few days at room temperature, and subsequently separated by distilling the alkyl 1,4diaza-cycloheptene.

SUMMARY OF THE INVENTION

We have now found that by carrying out the reaction between the saturated aliphatic ketone and the ethylenediamine under particular conditions it is possible to obtain alkyl diazacycloheptenes in considerably higher yields than those obtained using the processes disclosed in the literature.

The process of the present invention involves carrying out the reaction between the ethylenediamine and the saturated aliphatic ketone in the presence of a catalyst exhibiting an acid character. At the end of the reaction the resultant material is treated with a dehydrating agent having an alkaline character. The alkyl-1,4-diaza-cycloheptene is then isolated, after having removed the aqueous phase, by distillation of the raw reaction product.

DESCRIPTION OF THE PREFERRED EMBODIMENTS

The amount of acid catalyst employed is preferably from about 0.1 to 10 by weight of the total amount of the diamine and ketone reactants. Suitable acid catalysts that may be employed include organic acids such as formic acid, acetic acid, p-toluenesulphonic acid, or the like; inorganic acids such as hydrochloric acid, hydrobromic acid, hydroiodic acid, nitric acid, or the like; halogens such as bromine, iodine, or the like; salts having an acid character such as ammonium chloride, aluminum chloride, ammonium nitrate, magnesium nitrate, iron nitrate, or the like. Catalysts of the organic and inorganic acid type may also be employed in the form of their salts, e.g., salts formed with amines such as ethylenediamine, pyridine, morpholine, piperidine or the like.

The reaction between the ethylenediamine and the saturated ketone is preferably carried out in the absence of solvents. However, it is also possible to employ solvents such as alcohols, e.g., methyl alcohol, ethyl alcohol, etc., ethers, e.g., ethyl ether, isopropyl ether, tetrahydrofuran, dioxan, etc., hydrocarbons, e.g., petrolether, heptane, benzene, etc.

The reaction is conveniently carried out by mixing together the reactants at a temperature preferably of from about −15° C. to +30° C. followed by maintaining the temperature for from about 1 to 100 hours at from about 10° C. to 80° C. The reaction material is then dehydrated by the use of a compound such as NaOH KOH, CaO, $K_2CO_3$, or the like. The aqueous layer is separated, and then the alkyl-substituted 1,4-diaza-cycloheptene is isolated by means of distillation.

According to the method of the present invention the molar ratio of diamine to saturated aliphatic ketone is desirably 1:2. However, an excess of ketone on diamine may be employed, preferably an excess of ketone.

The products of the present invention may be employed for the preparation of nitrogen containing polymers such as polyamines (by condensation with, for instance, epichlorohydrine), polyamides (by condensation with a dicarboxylic acid), polyurea (by condensation with a diisocyanate), polyurethanes (by condensation with an alkylen-bis-chloroformate) etc., or as intermediate compounds for organic synthesis (particularly for the preparation of alkyl derivatives of homopiperazine by means of catalytic hydrogenation) in the present of Pt-hydrogenation catalysts for instance $PtO_2$-Adams (obtained as described in Gilman, Blatt "Organic Synthesis" Vol. I, Page 463, Ed. Wiley and Sons, N.Y. 1948) or a platinum catalyst supported on coal or other catalysts Pd, Ni etc.

The hydrogenation is preferably carried out in alcoholic solvents at a temperature comprised between 15° and 100° C. and a hydrogen pressure between 1 and 50 atm.

In order to obtain the homopiperazines it is also possible to hydrogenate the raw reaction material after having separated the aqueous phase.

The following examples will further illustrate the invention, all parts are by weight unless otherwise stated.

Examples 1-9

In the following table there are reported the operative conditions and the characteristics of resultant 5,7,7-trimethyl-1-1,4-diaza-4-cycloheptene obtained from ethylene diamine and acetone. Various compounds having an acid character were employed as the catalyst. In each instance, ethylenediamine was added to a mixture of acetone and catalyst which mixture previously had been cooled to −12° C. The addition of the ethylenediamine was at such a rate that the reaction temperature did not exceed 30° c. At the end of the addition of the ethylenediamine, the reaction mixture was maintained, for the times indicated in the table, at 18°-20° C. Then 100 ml. of heptane and 50 g. of solid NaOH (pellet form) were added. The whole was shaken for 45 minutes at room temperature. Thereafter the aqueous layer was separated from the organic phase. The heptane was distilled off at normal pressure and the residue, was fractionated by reduced pressure (between 10 and 20 mm. Hg).

Example 10

One hundred twenty grams (2 moles) of anhydrous ethylenediamine were added, in small quantities and with constant stirring, to 28 g. (4 moles) of methylethylketone (to which there had previously

TABLE

| Example | Acetone (mols) | Ethylene diamine (mols) | Catalyst (g.) | Reaction time (hrs.) | Yield percent | Boiling point (° C./mm. Hg) | $n_D^{20}$ |
|---|---|---|---|---|---|---|---|
| 1 | 2.4 | 1 | $HNO_3$ 65% * (3.85) | 24 | 79 | 87–89/14 | 1.4818 |
| 2 | 2.4 | 1 | HCl 36.5% * (6.84) | 24 | 77 | 92–94/19 | 1.4815 |
| 3 | 2.4 | 1 | HCOOH 99% * (2.5) | 24 | 75 | 87–89/15 | 1.4816 |
| 4 | 2.4 | 1 | $CH_3COOH$ (2.5) | 48 | 77 | 86–88/13 | 1.4815 |
| 5 | 2.07 | 1 | $CH_3COOH$ (2.5) | 96 | 75 | 87–88/14 | 1.4818 |
| 6 | 2.4 | 1 | $NH_4NO_3$ (5) | 24 | 77 | 88–90/15 | 1.4818 |
| 7 | 2.4 | 1 | $AlCl_3.6H_2O$ (5.5) | 24 | 71 | 90–91/16 | 1.4814 |
| 8 | 2.4 | 1 | $Fe(NO_3)_3.9H_2O$ (5) | 24 | 64 | 87–88/14 | 1.4815 |
| 9 | 2.4 | 1 | Ethylenediamine dichlorohydrate (4.6) | 48 | 77 | 90–91/16 | 1.4818 |

*The percentages are weight/weight and the solution is an aqueous solution.

been added 23 ml. of 36.5 4percent percent HCl the mixture having been cooled to −12° C.). The whole was cooled so as not to exceed a temperature of 30° C. The mixture was kept for 4 days at from 15° to 20° C., then 200 ml. of heptane and 100 g. of NaOH were added thereto. The reaction mixture was stirred for 45 minutes, the aqueous layer was separated, the heptane was removed by distillation, and then the residue was fractionated under reduced pressure, thereby obtaining 161 g. (yield 48 percent of 7-methyl -5,7-diethyl-1,4-diaza -4-cycloheptene having a boiling point of 109°–111° C./12 mm. Hg; $n_D^{20}$=1.4825.

Example 11

Employing the procedure of the previous examples, 148 g. (2 moles) of anhydrous 1,2-propylenediamine were added in small amounts and with constant stirring to 278.4 g. (4.8 moles) of acetone cooled to −15° C. and to which had previously been added 5.5 ml. of $HNO_3$ 65 percent. Care was taken that the temperature did not exceed 30° C. The mixture was kept for 24 hours at 15°–20° C, then 200 ml. of heptane and 100 g. of solid NaOH were added thereto. The whole was stirred for 45 minutes, the aqueous layer was separated, the volatile products were removed by distillation, and the residue was fractionated under reduced pressure, thereby obtaining 219 g. (yield 71 percent) of tetramethyl-1,4-diaza -4-cycloheptene having a boiling point of 88°–90° C./14mm. Hg; $n_D^{20}$=1.4740.

Various modifications and variations may be made in the details of the performance of the present invention without departing from the spirit and scope of the invention.

Having thus described our invention, what we desire to secure and claim by Letters Patent is:

We claim:

1. A process for the preparation of a substituted 1,4-diaza-cycloheptene of the general formula;

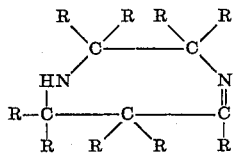

wherein R may be the same or different and is a hydrogen atom or an alkyl group having from one to 12 carbon atoms, this process comprising reacting a diamine of the general formula

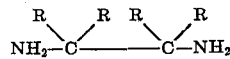

wherein R is as hereinabove defined with a saturated aliphatic ketone of the formula R—CO—R wherein R may be the same or different and is an alkyl group having from about one to 12 carbon atoms, said reaction being carried out in the presence of an acid catalyst, followed by treating the resultant material with an alkaline agent.

2. The process of claim 1 wherein the acid catalyst is hydrochloric acid, nitric acid, acetic acid, formic acid, ammonium nitrate, p-toluene-sulphonic acid, aluminum chloride ferric nitrate, or ethylenediamine dichlorohydrate.

3. The process of claim 1 wherein the alkaline agent is NaOH.

4. The process of claim 1 wherein the amount of catalyst employed is from about 0.1 to 10 by weight of the total amount of the diamine and ketone reactants.

5. A process for the preparation of a substituted 1,4-diaza-cycloheptene of the general formula;

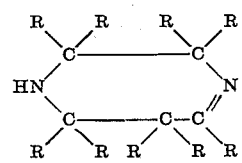

wherein R may be the same or different and is a hydrogen atom or an alkyl group having one or two carbon atoms comprising reacting a diamine of the general formula;

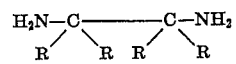

wherein R is as hereinabove defined with a saturated aliphatic ketone of the formula R—CO—R, wherein R be the same or different and is an alkyl group having one or two carbon atoms, said reaction being carried out in the presence of an acid catalyst followed by treating the resultant material with an alkaline agent.

6. A process for the preparation of a substituted 1,4-diaza-cycloheptene comprising reacting a diamine selected from the group consisting of ethylene diamine and 1,2-propylene diamine with a ketone selected from the group consisting of acetone and methylethylketone, said reaction being carried out in the presence of an acid catalyst followed by treating the resultant material with an alkaline agent.

* * * * *

PO-1050
(5/69)

UNITED STATES PATENT OFFICE
CERTIFICATE OF CORRECTION

Patent No. 3,625,958            Dated December 7, 1971

Inventor(s) GIUSEPPE CANTATORE and ALBERTO BONVICINI

It is certified that error appears in the above-identified patent and that said Letters Patent are hereby corrected as shown below:

Title Page, right-hand column, first line: "CLAIM:" should read -- ABSTRACT OF THE DISCLOSURE --; Column 1, line 39: "5,7,7,trimethyl-" should read -- 5,7,7-trimethyl- --; Column 1, line 42: "(yield and about 40 see" should read: -- (yield about 40%); see --; Column 1, line 47: "1,4diaza-cycloheptene" should read -- 1,4-diaza-cycloheptene --; Column 1, line 70: "0.1 to 10 by weight" should read -- 0.1 to 10% by weight --; Column 2, line 18: "K2CO3," should read -- $K_2CO_3$, --; Column 2, line 35: "in the present" should read -- in the presence --; Column 2, line 52: "5,7,7-trimethyl-1-" should read -- 5,7,7-trimethyl- --; Column 2, line 60: "30°c" should read -- 30°C --; Column 2, line 74: "28 g" should read -- 288 g --; Columns 3 and 4, in the Table, under the heading "Catalyst (g)", line 3: "99%* (2.5)" should read -- 99% (2.5) --; Column 3, line 16: "36.5 4percent percent HCl" should read -- 36.5% HCl, --; Column 4, Claim 2, line 28: "aluminum chloride" should read -- aluminum chloride, --; Column 4, Claim 4, line 33: "0.1 to 10 by weight" should read -- 0.1 to 10% by weight --.

Signed and sealed this 23rd day of May 1972.

(SEAL)
Attest:

EDWARD M. FLETCHER, JR.　　　　　　　　ROBERT GOTTSCHALK
Attesting Officer　　　　　　　　　　　　Commissioner of Patents